United States Patent [19]

Takeda et al.

[11] Patent Number: 5,073,949
[45] Date of Patent: Dec. 17, 1991

[54] PERSONAL VERIFICATION APPARATUS

[75] Inventors: Masahiro Takeda, Tokyo; Satoshi Uchida, Yokohama, both of Japan

[73] Assignee: Kabushiki Kaisha Toshiba, Kawasaki, Japan

[21] Appl. No.: 475,863

[22] Filed: Feb. 6, 1990

[30] Foreign Application Priority Data

| Mar. 16, 1989 | [JP] | Japan | 1-64323 |
| Mar. 31, 1989 | [JP] | Japan | 1-83583 |
| May 25, 1989 | [JP] | Japan | 1-131852 |

[51] Int. Cl.$^5$ .............................................. G06K 9/00
[52] U.S. Cl. ......................................... 382/2; 382/4; 382/18
[58] Field of Search ............................ 382/4, 2, 18, 9; 356/383, 384

[56] References Cited

U.S. PATENT DOCUMENTS

| 4,136,332 | 1/1979 | Kadota et al. | 340/146.3 H |
| 4,186,378 | 1/1980 | Moulton | 340/146.3 E |
| 4,573,193 | 2/1986 | Shuto et al. | 382/2 |
| 4,878,248 | 10/1989 | Shyu et al. | 382/9 |

FOREIGN PATENT DOCUMENTS

| 0173688 | 9/1985 | Japan | 382/9 |
| 0175865 | 8/1986 | Japan | 382/2 |

OTHER PUBLICATIONS

Bishop et al., "Character Recognition Approach Involving Histogram Classification," *IBM Technical Disclosure Bulletin*, vol. 21, No. 9, 2/79.

Primary Examiner—Michael Razavi
Assistant Examiner—Andrew W. Johns
Attorney, Agent, or Firm—Oblon, Spivak, McClelland, Maier & Neustadt

[57] ABSTRACT

When verification is performed using a plurality of fingers in accordance with a positional relationship of the joints of the fingers, an image of the plurality of fingers is separated into the images of the respective fingers, and comparison and collation are individually performed for the fingers. Phase data of each finger can be individually extracted, and a collation result of the fingers and phase shift data between the fingers based on phase data are generally determined. A guide member for guiding the placement of the fingers is mounted on a finger table to define positions at which the plurality of fingers are placed.

10 Claims, 9 Drawing Sheets

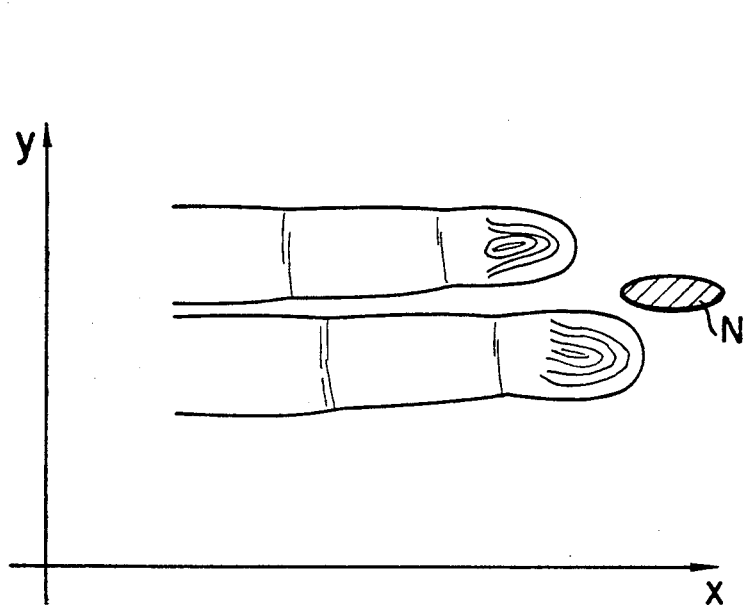
F I G. 1A
F I G. 1B
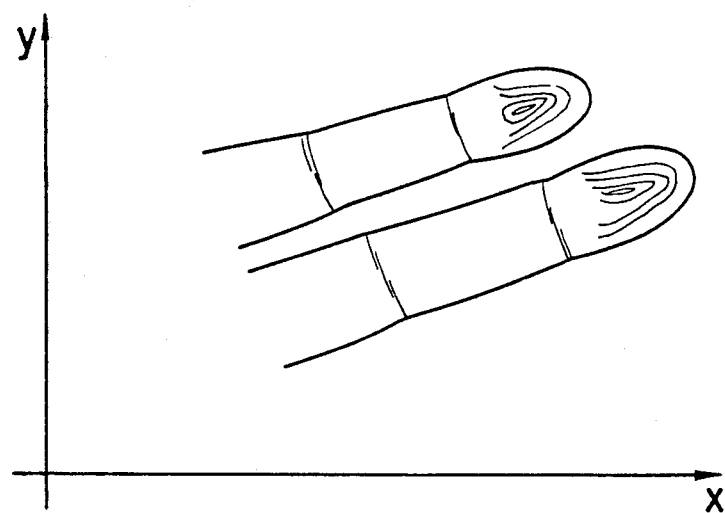
F I G. 2A
F I G. 2B

SUM OF PIXEL DENSITY IN X DIRECTION

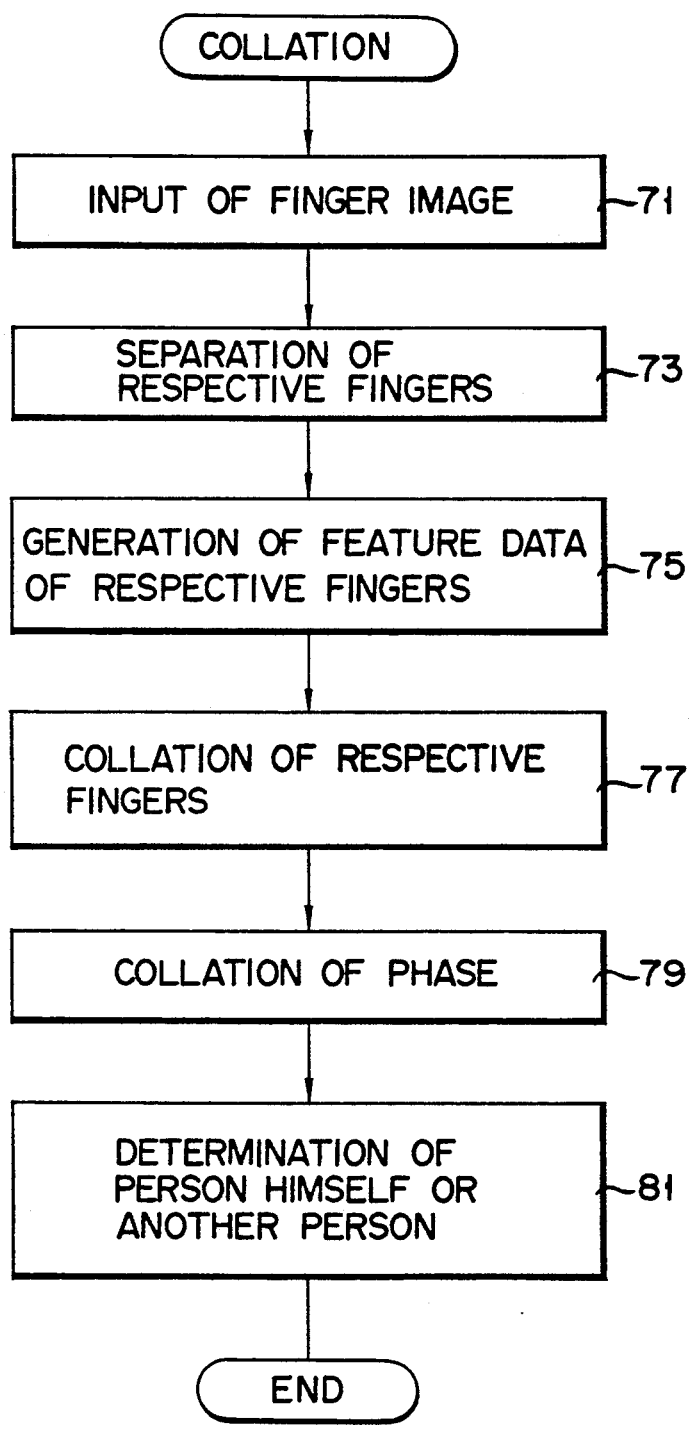
F I G. 7

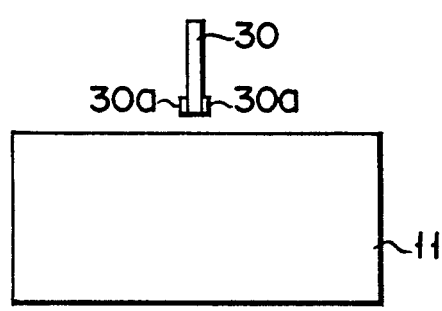
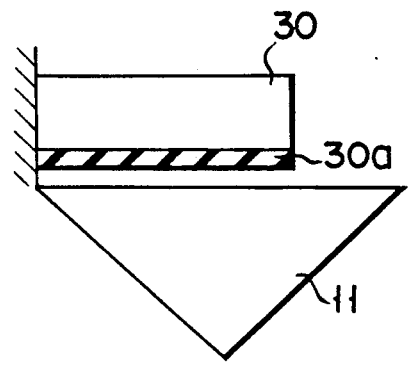
FIG. 9A  FIG. 9B
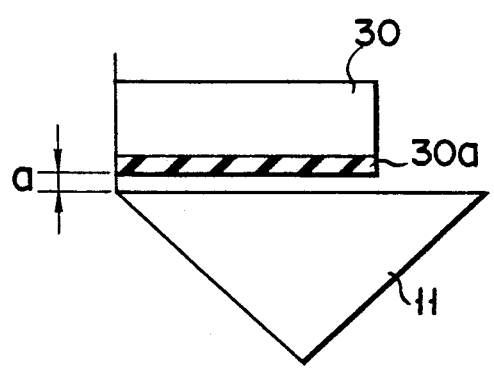
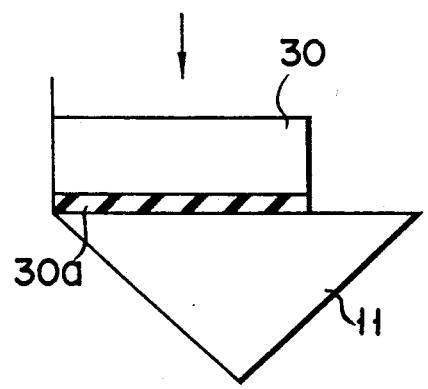
FIG. 10A  FIG. 10B

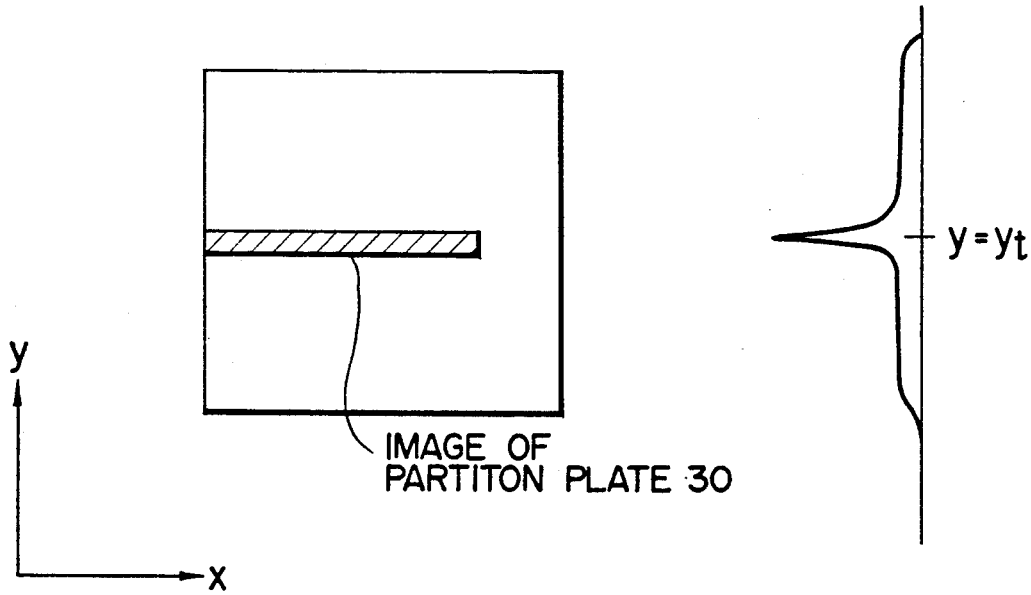
F I G. 11A  F I G. 11B

PERSONAL VERIFICATION APPARATUS

BACKGROUND OF THE INVENTION

1. Field of the Invention

The present invention relates to a personal verification apparatus for performing personal verification using a human biometric feature such as a hand geometry or a fingerprint.

2. Description of the Related Art

When personal verification is performed, an identification card which verifies the person himself or an identification number which is known by only the person himself is used. When the identification card is used, however, the card may often be lost or stolen. Therefore, it is difficult to assure the safety of the card. When the identification number is used, the number may often be forgotten or illegally used by a third person. For this reason, it is difficult to verify the person himself safely and reliably.

In order to solve the above problems, a collation method to verify the person himself using a personal human biometric feature has been developed. For example, a method utilizing a fingerprint disclosed in Published Unexamined Japanese Patent Application No. 59-2184, or a method utilizing a hand geometry including data of, e.g., the length and width of the fingers disclosed in Published Unexamined Japanese Patent Application No. 61-122797 are known as the verification method using the human biometric feature.

When the fingerprint is utilized, however, in order to collate a fingerprint read by a reader with a fingerprint registered in a memory in advance, complicated two-dimensional processing must be performed.

When the hand geometry is utilized, data of the palm including the length and width of five fingers of a person must be read by a reader. For this reason, the reader having the same size as that of the palm is required, and the size of the reader is undesirably increased. In order to solve the above problem, a verification method to verify the person himself using the length between the joints of a finger has been considered. In this verification method, image data of a finger is read by a reader, and the read image data of the finger is converted into a binary signal by an A/D converter. The contour of the finger is obtained in accordance with the binary signal, and the positions of the joints can be obtained from this contour. The length between the obtained joint positions is collate with the length between the joints stored in a memory in advance by a collator to verify the person himself.

In the collation using only the length between joints, however, an amount of data required to perform collation is small. Therefore, it is difficult to improve the accuracy of the collation. In order to accurately detect the length between the joints, the position of the distal end of the finger must be accurately obtained. However, in order to accurately obtain the position of the distal end of the finger, a unit for detecting the distal end of the finger is required, and an arrangement of the entire apparatus becomes complicated.

Note that, in "FINGER COLLATION AND PATTERN IMAGE PROCESSING APPARATUS" (U.S. Ser. No. 07/364,167) filed by the same applicant on June 12, 1989, the following method is disclosed. That is, in this method, image data of one finger is added in a direction perpendicular to the longitudinal direction of the finger, feature data of the finger is generated, and the feature data is compared with feature data to be collated which is generated and stored in advance.

SUMMARY OF THE INVENTION

It is an object of the present invention to provide a personal verification apparatus which can perform highly accurate collation without being adversely affected by a change in positional relationship of a plurality of fingers, thus improving verification reliability.

It is another object of the present invention to provide a personal verification apparatus which can perform highly accurate collation without decreasing a personal determination ratio due to a phase shift by extracting and evaluating phase data between the fingers, thus improving verification reliability.

It is still another object of the present invention to provide a personal verification apparatus which can easily compute accurate coordinate positions at high speed to separate the finger images, thus improving collation reliability.

According to the first aspect of the present invention, there is provided a personal verification apparatus for performing personal verification using a plurality of fingers, comprising: feature data memory means for storing feature data to be collated of the fingers; input means for inputting image data of the plurality of fingers; separating means for separating the image data of the plurality of fingers using data obtained by adding a density of the image data of the plurality of fingers obtained from the input means in a longitudinal direction of the fingers; generating means for adding the density of the image data of the fingers separated by the separating means in a direction perpendicular to the longitudinal direction of the fingers to output the added data as feature data of the fingers; and collating means for individually comparing and collating the feature data obtained by the generating means with the feature data to be collated stored in the feature data memory means for the respective fingers to determine coincidence or noncoincidence.

According to the second aspect of the present invention, there is provided a personal verification apparatus for performing personal verification using a plurality of fingers, comprising: input means for inputting image data of the plurality of fingers; separating means for separating the image data of the plurality of fingers input by the input means into image data for the respective fingers; feature data generating means for adding a density of the image data of the respective fingers separated by the separating mean in a direction perpendicular to a longitudinal direction of the fingers to output data as feature data of each of the fingers; memory means for storing feature data to be collated corresponding to the feature data output from the feature data generating means; collating means for individually collating the feature data output from the feature data generating means with the feature data to be collated stored in the memory means for the respective fingers; phase shift detecting means for computing a phase coincidence position of the feature data and the feature data to be collated for the respective fingers in accordance with a collation result obtained by the collating means to detect a phase shift between these data based on the phase coincidence position; and determining means for determining personal verification in accordance with the collation result of the respective fingers obtained by the collating means and the phase shift data detected by the phase shift detecting means.

According to the third aspect of the present invention, there is provided a personal verification apparatus for performing personal verification using a plurality of fingers, comprising: memory means for storing feature data to be collated of the fingers; input means, having a finger table on which the fingers are placed and a guide member for guiding the placement of the fingers, for inputting image data of the fingers; means for adding a density of the image data of the fingers input by the input means in a direction perpendicular to a longitudinal direction of the fingers to generate feature data; and collating means for collating the feature data generated by the generating means with the feature data to be collated stored in the memory means.

When personal verification is performed using a plurality of fingers, the positional relationship of the joints of the fingers may often be shifted slightly depending on how the fingers are placed, e.g., the inclination of the fingers. According to the present invention, when verification is performed in accordance with the positional relationship of the joints of fingers using a plurality of fingers, the plurality of fingers are individually separated, and comparison and collation are individually performed for the respective fingers. Therefore, high-accuracy collation can be realized without being adversely affected by the change in positional relationship of the plurality of fingers.

Since phase shift data of the fingers can be independently extracted from the comparison result between the feature data of the fingers and the feature data to be collated, and the extracted data can be evaluated, a degradation in determination capability of the person himself/another person caused by a slight phase shift between the fingers upon an input of a finger image can be prevented.

When a plurality of fingers are placed on a finger table along a partition plate, any inclination of the fingers can be prevented. When a correspondence between the position of the partition plate and the coordinate positions on the input image is established in advance, a finger image can be separated for the respective fingers without specific processing upon an input of the image.

BRIEF DESCRIPTION OF THE DRAWINGS

FIGS. 1A through 2B are views for explaining problems in a separating operation;

FIG. 7 is a flow chart for explaining collation in the second embodiment;

FIGS. 9A and 9B are views showing the positional relationship between a partition plate and a finger table in the third embodiment shown in FIG. 8;

FIGS. 10A and 10B are views for explaining a difference in position of the partition plate with respect to the finger table in the third embodiment shown in FIG. 8; and FIGS. 11A and 11B are views showing a relationship between an image of the partition plate and a sum signal in the y direction in the third embodiment shown in FIG. 8.

DETAILED DESCRIPTION OF THE PREFERRED EMBODIMENTS

Figure 3:
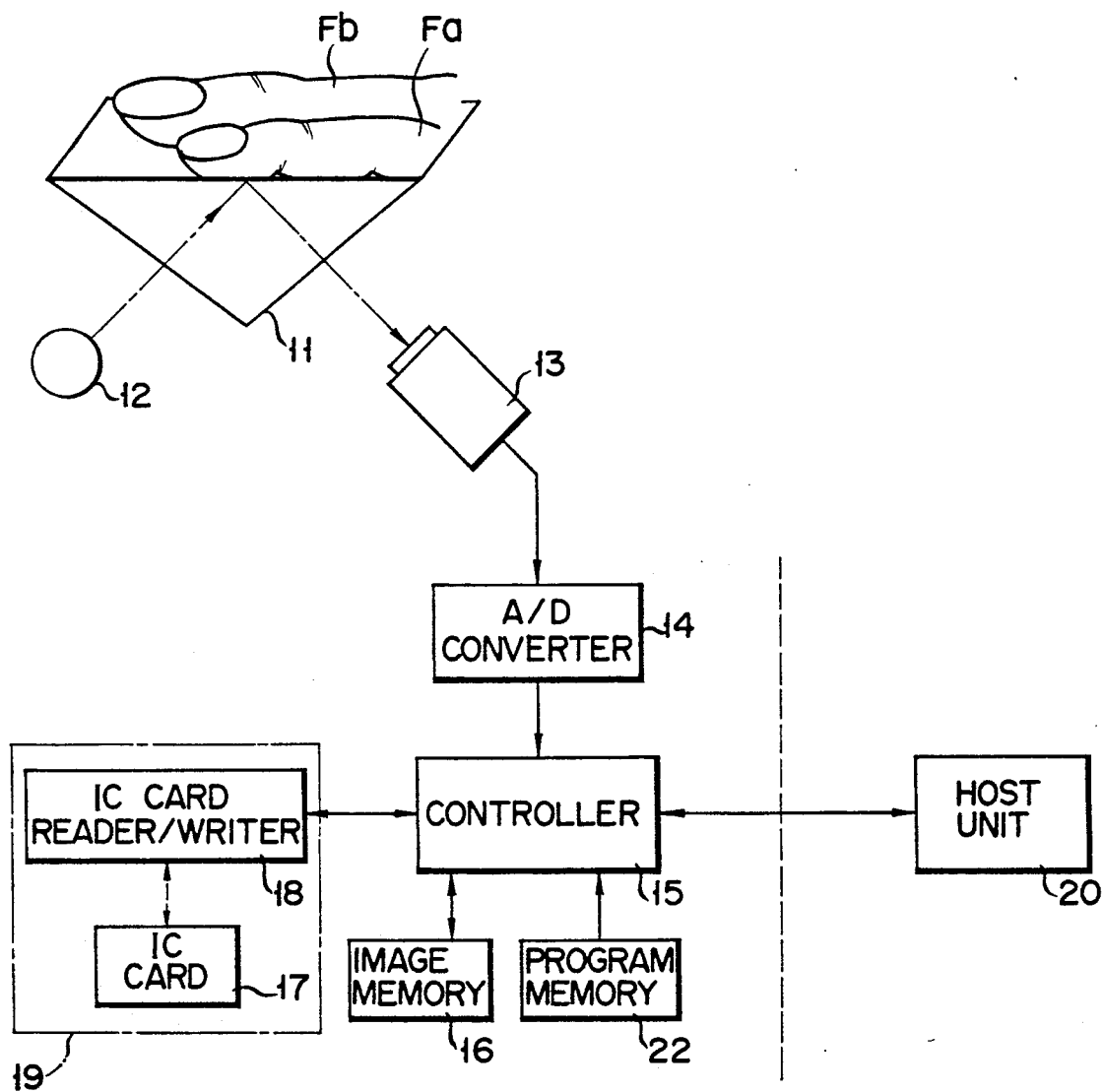
FIG. 3 is a block diagram showing a personal verification apparatus according to an embodiment of the present invention.

FIG. 3 is a block diagram showing a personal verification apparatus according to the present invention.

A finger table 11 consists of, e.g., a transparent prism. A person to be verified places, e.g., two fingers Fa and Fb on the finger table 11 when finger image data is input. When light is emitted from a light source 12 disposed below the finger table 11 through the finger table 11, the image data of the fingers Fa and Fb placed on the finger table 11 is read by a camera 13 as a reflection optical image.

The image data of the fingers Fa and Fb input to the camera 13 is converted into an electrical signal. Thereafter, the electrical signal is A/D converted and digitized by an A/D converter 14. The digital finger image is temporarily stored in an image memory 16 by a controller 15.

An IC card 17 stores feature data to be collated about arbitrary fingers (the fingers Fa and Fb in this embodiment) extracted from a finger image of the person to be verified in advance. For example, the feature data includes a sum signal obtained by adding a pixel density of the finger image in a direction perpendicular to the longitudinal direction of the finger. The feature data is written in (in a registration mode) or read out from (in a collation mode) the IC card 17 by an IC card reader/writer 18 controlled by the controller 15. The feature data of the person to be verified are registered in advance in a dictionary section 19 by the IC card 17 and the reader/writer 18. A program memory 22 stores programs shown in the flow charts in FIGS. 5 to 7.

The controller 15 executes the programs stored in the program memory 22. The feature data of the fingers Fa and Fb are obtained from the finger images stored in the image memory 16, and the obtained feature data is compared (aligned) with the feature data to be collated corresponding to the respective fingers registered in the dictionary section 19, thus verifying the person himself. The controller 15 separates the data about the fingers Fa and Fb using the data (sum signal in the x direction) obtained by adding the density of the finger image for the two fingers Fa and Fb in the longitudinal direction to individually perform the collation for the fingers Fa and Fb using the feature data. More specifically, the density of the input finger image for the plurality of (two) fingers is added in the longitudinal direction of the fingers, and the separating point (coordinate) of the fingers is obtained by a sum signal in the x direction obtained by the above addition, thus individually separating the plurality of fingers at this position. The feature data is obtained for the respective fingers, and the collation is performed using the feature data to be collated corresponding to the fingers.

However, in order to separate the respective finger images by the above described method, the following problems must be overcome.

a. It is time-consuming to compute sum signal in the y direction and retrieval, retrieve the minimum value of the sum signals, and the like.
b. If the input image includes noise N as shown in FIG. 1A, the obtained sum signal in the y direction has a minimum value having a poor reproducibility as shown in FIG. 1B.
c. If the fingers are placed inclined to the y axis as shown in FIG. 2A, the sum signal in the y direction has no definite minimum value as shown in FIG. 2B.

A host unit 20 controls, e.g., the opening/closing of a door or an ON/OFF state of an alarm buzzer in accordance with the collation result from the controller 15. A control target of the host unit 20 is different depending on a security system to which the personal verification apparatus of the present invention is applied.

The processing in the controller 15 will be described hereinafter in detail with reference to FIGS. 4A through 4D. In FIGS. 4A through 4D, the forefinger and the middle finger of the right hand are used as the fingers Fa and Fb, respectively. Assume that this is determined by the will of the person to be verified himself, and only the person himself can know the processing contents in principle.

Figure 4A:
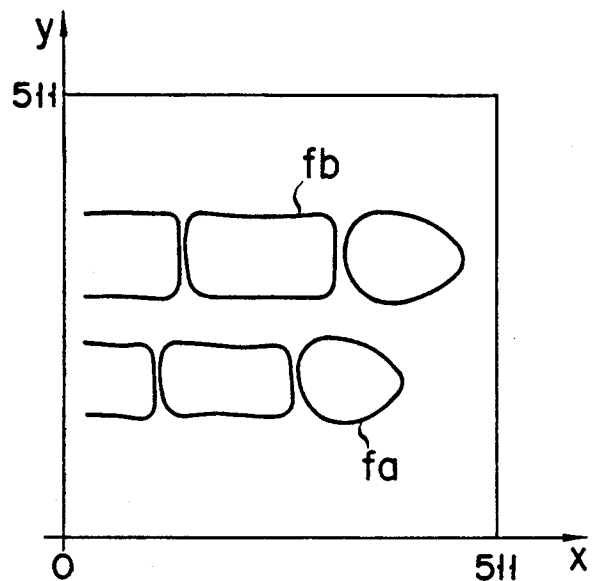
FIGS. 4A through 4D are views for explaining a case wherein personal verification is performed using two fingers in the embodiment shown in FIG. 3.

In FIG. 4A, reference symbols fa and fb denote finger images, i.e., image patterns of the forefinger Fa and the middle finger Fb which are read by the camera 13, and digitized by the A/D converter 14. Assume that these finger images fa and fb are stored in an area of 512 pixels×512 pixels at a resolution of, e.g., 10 lines/mm.

Figure 4B:
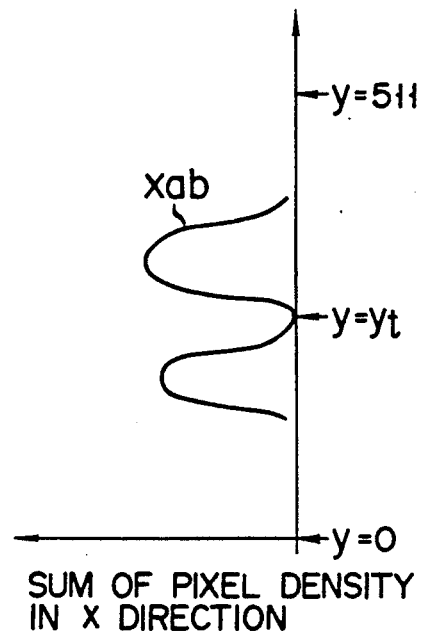

The separation of the forefinger Fa and the middle finger Fb will be described below. When the images of the two fingers Fa and Fb placed on the finger table 11 are fetched in the image memory 16, a finger image sum signal Xab is obtained in a longitudinal direction x of the fingers, as shown in FIG. 4B. This sum signal Xab in the x direction normally includes a high-frequency component, and it is difficult to process this signal. Therefore, the signal is passed through, e.g., a low-pass filter to eliminate the high-frequency component.

A sum signal Xab in the x direction thus obtained has two maximum peaks corresponding to the forefinger Fa and the middle finger Fb. Therefore, when a minimum peak between the two maximum peaks is detected, a y coordinate (separating point) yt which separates the two fingers Fa and Fb can be obtained. The coordinate yt can be obtained by computing a minimum value of the sum signal Xab in the x direction after the signal has passed through, e.g., the low-pass filter.

Figure 4C:
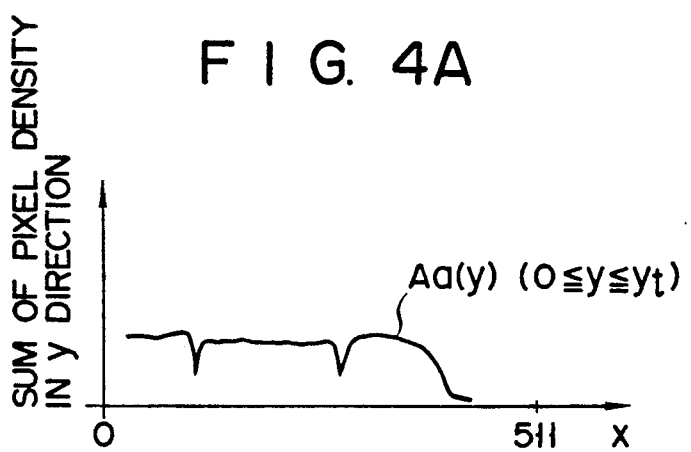
Figure 4D:
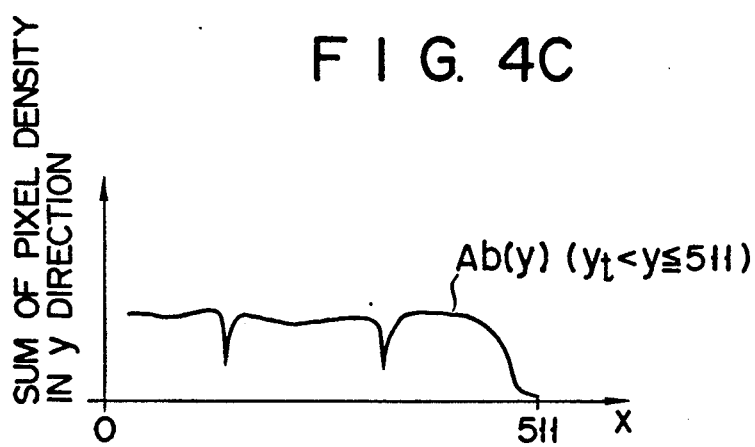

On the other hand, when the feature data of the forehand finger Fa and the middle finger Fb are obtained, the density of each of the finger images fa and fb is added in a direction y perpendicular to the longitudinal direction of the finger in accordance with the obtained separating point yt, and the sum signals in the y direction can be obtained, respectively. More specifically, of the pixels (512) in the y direction, when a sum signal in the y direction in the range from O to the separating point yt is obtained, feature data Aa(y) of the forefinger Fa is generated, as shown in FIG. 4C. In addition, when a sum signal in the y direction in the range from the separating point yt to 511 is obtained, feature data Ab(y) of the middle finger Fb is generated, as shown in FIG. 4D.

These feature data Aa(y) and Ab(y) respectively have minimum peaks (minimum values) at positions of the lateral wrinkles corresponding to the joint portions of the fingers, and these minimum peaks serve as parameters (individuality) to verify the person himself.

An operation of the personal verification apparatus with the above arrangement will be described hereinafter. The operation of this apparatus is classified into "registration" and "collation".

Figure 5:
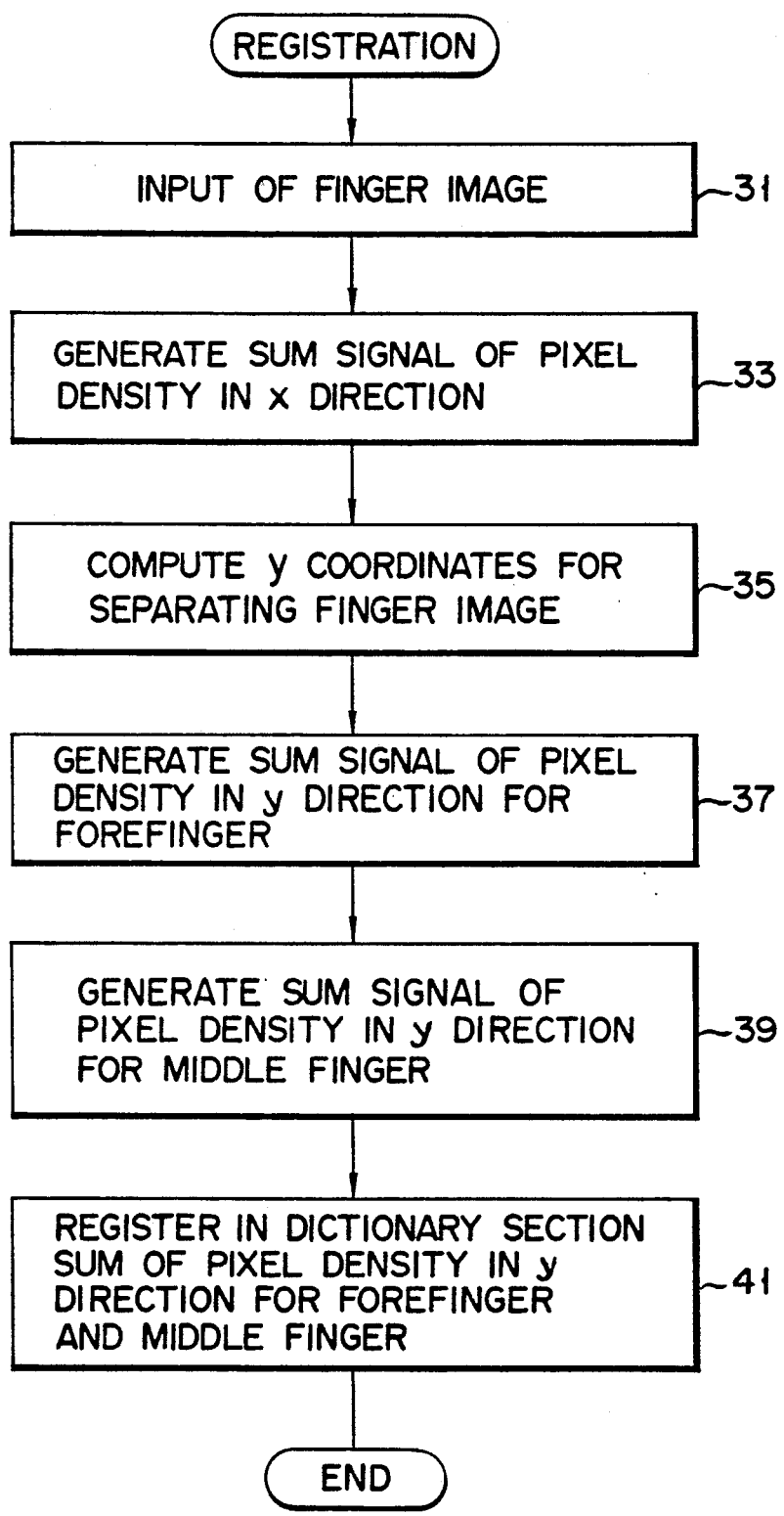
FIG. 5 is a flow chart for explaining registration in the embodiment shown in FIG. 3.

FIG. 5 is a flow chart for explaining "registration". Assume that, in a registration mode, the forefinger Fa and the middle finger Fb of the right hand of the person to be verified are placed on the finger table 11. Image data in accordance with a difference of contact/noncontact between the fingers Fa and Fb and the finger table 11 is converted into an electrical signal by the camera 13. The electrical signal is A/D converted to be digitized. Thereafter, the digital signal is temporarily stored in the image memory 16 as the finger images Fa and Fb (step 31).

In the controller 15, the pixel densities of the finger images fa and fb are added in the longitudinal direction x of the fingers. Therefore, as shown in FIG. 4B, the sum signal Xab in the x direction is generated (step 33).

The sum signal Xab in the x direction is smoothed by a low-pass filter (not shown), and the separating point yt which separates the fingers Fa and Fb is computed in accordance with a y coordinate of the minimum value (step 35).

When the separating point yt is obtained as described above, the density of each of the finger images fa and fb is added in the direction y perpendicular to the longitudinal direction x of the fingers, in the controller 15. More specifically, sum signals of pixel densities in the y direction for the finger images fa and fb are generated in accordance with the separating point yt. Therefore, the feature data Aa(y) for the forefinger Fa is generated (step 37), as shown in FIG. 4C, and the feature data Ab(y) for the middle finger Fb is generated, as shown in FIG. 4D (step 39).

The feature data as the sum signals in the y direction for the forefinger Fa and the middle finger Fb obtained in this manner are subjected to proper band-pass filter processing, and are converted into the data suitable for the succeeding collation. The resultant data are stored in the dictionary section 19 (step 41). More specifically, the above features are registered in the IC card 17 of the person to be verified through the reader/writer 18 under the control of the controller 15.

As described above, the registration is completed, and hence the feature data to be collated associated with the fingers Fa and Fb of the person to be verified are registered in the dictionary section 19.

Figure 6:
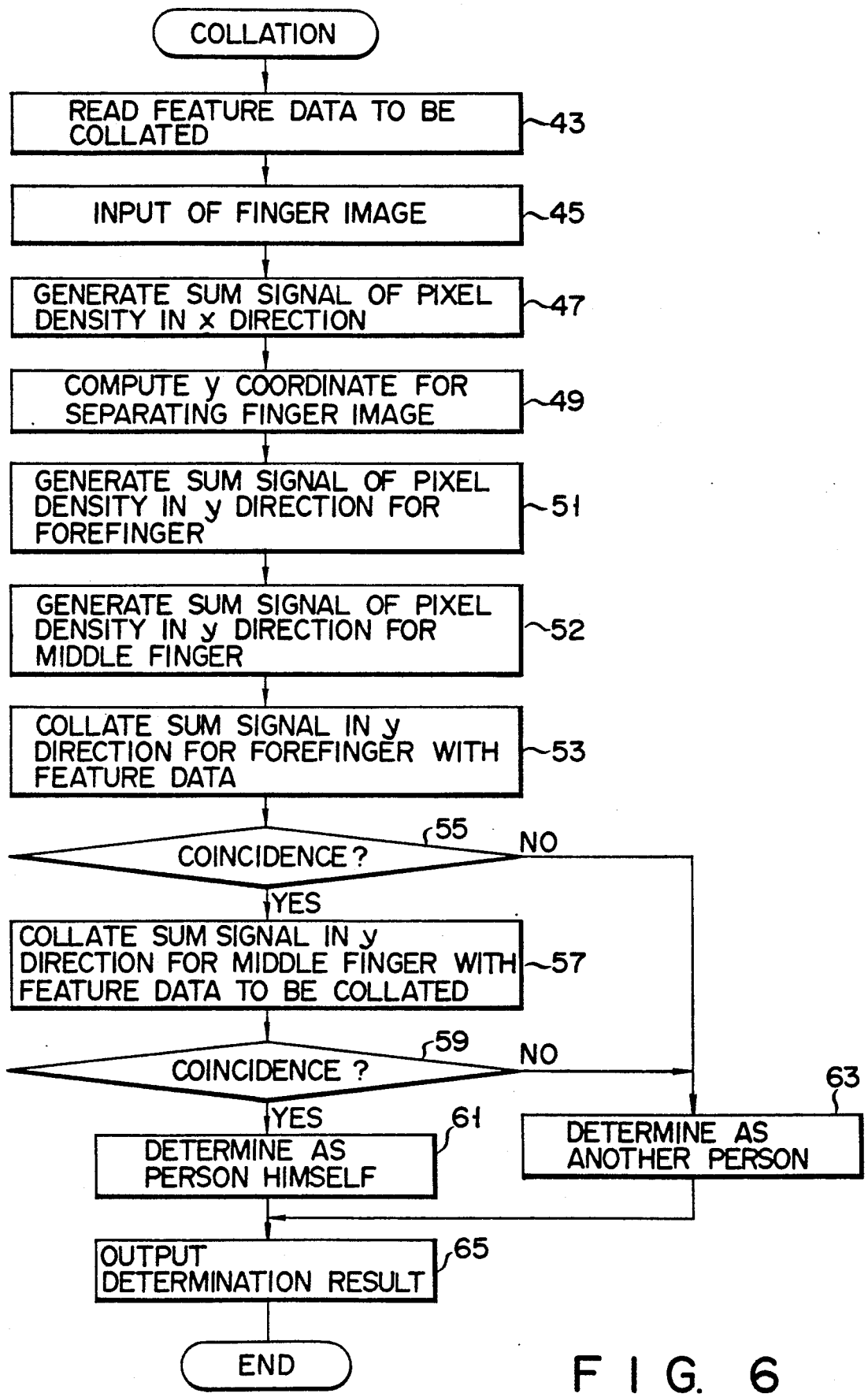
FIG. 6 is a flow chart for explaining collation in the embodiment shown in FIG. 3.

FIG. 6 is a flow chart for explaining "collation". In FIG. 6, the two feature data to be collated which are stored in the dictionary section 19 in advance are read out from the dictionary section 19 (step 43).

Then, an input of the finger images (step 45) and generation of the feature data Aa(y) for the forefinger Fa and the feature data Ab(y) for the middle finger Fb in accordance with the input finger images (steps 47, 49, 51, and 52) are achieved following the same operations as in the above-described registration.

When the feature data Aa(y) and Ab(y) serving as the sum signals in the y direction for the two fingers Fa and Fb are generated, the feature data to be collated read out from the dictionary section 19 are aligned with the feature data Aa(y) and Ab(y) generated in accordance with the finger images in units of corresponding fingers, thus performing collation (step 53).

Assume that one of the two feature data read out from the dictionary section 19 is Aad(i), and one of the feature data generated in accordance with the finger images fa and fb, e.g., the feature data in accordance with the finger image fa is Aa(i). Assume that the number of elements in each sum signal is "N". Although "N" is, e.g., 512 in this embodiment, various values can be set in accordance with applications. A sum result, obtained by adding a squared difference of the feature data Aad(i) and the data Aa(i+m) obtained by shifting the feature data Aa(i) by m (m is a distance in the x direction) in a given range, is Sa(m). This sum result Sa(m) is defined as:

$$Sa(m) = 1/(N - m) \sum_{i=1}^{N-m} \{Aa(i + m) - Aad(i)\}^2$$

for m≧0, and $$Sa(m) = 1/(N + m) \sum_{i=-m+1}^{N} \{Aa(i + m) - Aad(i)\}^2$$

for m<0. In this case, the sum result Sa(m) is a parameter representing a degree of coincidence between the feature data Aad(i) read out from the dictionary section 19 and the data Aa(i+m) obtained by shifting the feature data Aa(i) generated in accordance with the finger image by m. The smaller the sum result Sa(m) is, the higher the degree of coincidence. Therefore, m is changed within a given range, and alignment can be performed at ma where the sum result Sa(m) at this time is minimum. In other words, the value of Sa(ma) obtained when the sum result Sa(m) is minimum serves as a result of collation.

The obtained collation result Sa(ma) is used to determine whether the person to be verified is the person himself (step 55). In this case, it is determined whether the person to be verified is the person himself or another person in accordance with the relationship in magnitude of the collation result Sa(ma) and a threshold value TH serving as a reference of the determination which is experimentally obtained. More specifically, Sa(ma)≦THa      coincidence Sa(ma)>THa      noncoincidence As the determination result, if "coincidence" is determined, the other feature data Abd(i) read out from the dictionary section 19 is collated with the feature data Ab(i) generated in accordance with the finger image fb following the same operations as the above operation (step 57). The obtained collation result is used to determine whether the person to be verified is the person himself in the same manner as in the above operation (step 59). More specifically, Sb(m)≦THb      coincidence Sb(m)>THb      noncoincidence where Sb(m) is the collation result, and THb is a threshold value serving as a reference of the determination which is experimentally obtained.

Note that two kinds of the threshold values THa and THb used in this embodiment may be equal to each other, or may be different from each other depending on the security.

In accordance with the collation result obtained for the forefinger Fa and the middle finger Fb, it is finally determined whether the person to be verified is the person himself (steps 61 and 63). In this case, only when the person himself is determined for both the fingers Fa and Fb (step 61), the person to be verified is determined as the person himself. Unless the person himself is determined for both the fingers Fa and Fb (step 63), the person to be verified is not determined as the person himself. However, when the security control is not so important, in order to improve passing efficiency and to achieve a smooth operation, the person to be verified may be determined as the person himself if the person himself is determined for only one finger. In addition, a determination function may be used to determine whether the person to be verified is the person himself or another person.

As the determination result, if the person to be verified is determined as the person himself, a coincidence signal is output to the host unit 20. If it is determined as another person, a noncoincidence signal is output to the host unit 20 (step 65). Then, in the host unit 20, processing in response to one of these signals is performed in accordance with the security system to which the apparatus of this invention is applied. For example, a door is opened in response to the coincidence signal, and an alarm buzzer is turned on in response to the noncoincidence signal.

As described above, the fingers are separated from a plurality of finger images to perform independent collation of the respective fingers. For this reason, even if a positional relationship between the fingers is shifted in accordance with how the fingers are placed, high-accuracy collation can be performed, thus improving the reliability of verification.

FIG. 7 is a flow chart for explaining an operation of the second embodiment of the present invention. In this embodiment, verification is performed using both of feature data collation and phase collation.

The principle of the phase collation is as follows. Assume that the degree of coincidence is maximum when the feature data of the forefinger read out from the dictionary section is shifted from the feature data generated in accordance with the finger image by m (m is a distance in the x direction). In this case, if the person to be verified is the person himself, this must be applicable to the case of the middle finger. Therefore, upon the phase collation, when an attempt is made to collate the forefinger of the right hand with the middle finger of the left hand, a coincidence cannot be obtained for the middle finger although a coincidence can be obtained for the forefinger. Therefore, the person to be verified can be determined as another person.

Note that the operations in steps 71, 73, 75, and 77 in the flow chart in FIG. 7 are the same as those in the flow chart shown in FIG. 6. Therefore, a description of these operations will be omitted.

Phase collation processing in step 79 will be described below. Assume that the value m is changed within a given range, and m obtained when the value Sa(m) is minimum is referred to as a shift element Ma of the forefinger. Assume that the alignment can be performed at Ma, and a degree of coincidence Sa(M) of a sum signal of the forefinger at this time is the collation result. The same operations are performed for the middle finger Fb to obtain a shift element Mb of the middle finger and a degree of coincidence Sb(M) of the sum signal.

Then, the phase collation is performed. This collation is performed by calculating a degree of phase coincidence PD. The phase coincidence PD is defined as:

$$PD = Mb - Ma$$

If the phase relationship of the input finger images between the middle finger and the forefinger in the registration mode completely coincides with that in the collation mode, the phase coincidence position of the finger in the registration mode coincides with that in the collation mode. Therefore, Mb=Ma, and the degree of the phase coincidence PD in the above equation is set to be "0". Thus, the smaller the shift in phase is, the smaller the degree of the phase coincidence PD. Therefore, if the person to be verified is the person himself, the value PD is small.

In step 81, it is determined whether the person to be verified is the person himself or another person by combining three parameters Sa(Ma), Sb(Mb), and PD. In order to perform the determination by combining the parameters, the well-known method using the following determination function may be employed:

$$DF = a \times Sa(Ma) + b \times Sb(Mb) + c \times PD$$

where a, b, and c are constants.

As represented in the above equation, the three parameters are linearly coupled to calculate a new parameter DF. The constants a, b, and c in the above equation are selected using a statistical method so that the capability to determine whether the person to be verified is the person himself or another person is maximum. For example, a method using a maharanobis distance is disclosed as the statistical method in the literature ("Multivariate Analysis", Okuno, et al., Science and Technology Society of Japan, 1971, pp. 259–321).

A threshold value TH is set in advance to determine whether the person to be verified is the person himself/another person. The person to be verified is determined as the person himself/another person depending on whether DF exceeds the threshold value TH. That is,

| | |
|---|---|
| DF≦TH | determine as the person himself |
| DF>TH | determine as another person |

The determination of the person himself/another person may often be respectively performed by the above three parameters, and the three results may be logically combined. More specifically, the determination of the person himself/another person is performed for the parameter Sa(Ma).

| | |
|---|---|
| Sa(Ma)≦THa | determine as the person himself |
| Sa(Ma)>THa | determine as another person |

In the determination for the parameters Sb(Mb) and PD, threshold values THb and THp are respectively set in advance to determine the person to be verified as the person himself/another person as follows:

| | |
|---|---|
| Sb(Mb)≦THb | determine as the person himself |
| Sb(Mb)>THb | determine as another person |
| PD≦THp | determine as the person himself |
| PD>THp | determine as another person |

The determination results for the parameters Sa(Ma), Sb(Mb), and PD are logically combined to finally determine the person to be verified as the person himself/another person. For example, in a system which requires high safety, only when the person himself is determined in all of the parameters Sa(Ma), Sb(Mb), and PD, the person to be verified is determined as the person himself, and the person to be verified is determined as another person in the other cases. Various combinations can be considered.

After the above collation is completed, the determination result of the person himself/another person is sent to the host unit 20. In the host unit 20, processing in accordance with the determination result is performed. For example, when the person to be verified is determined as another person, an alarm buzzer is turned on. These processing steps are different from each other depending on the security system to which the apparatus of the present invention is applied.

Thus, although phase shift data between the fingers includes individuality, the phase relationship may be shifted slightly depending on how the fingers are placed. Due to this phase shift, the determination capability of the person himself/another person is degraded. For example, the person himself may often be determined as another person, or another person may often be determined as the person himself. Therefore, in this invention, the phase shift data between the fingers can be independently extracted from the comparison result of the feature data of the fingers and the feature data to be collated, and the extracted data can be evaluated. Therefore, the degradation in determination capability of the person himself/another person due to a change in slight shift between the fingers upon an input of the finger images can be prevented.

Figure 8:
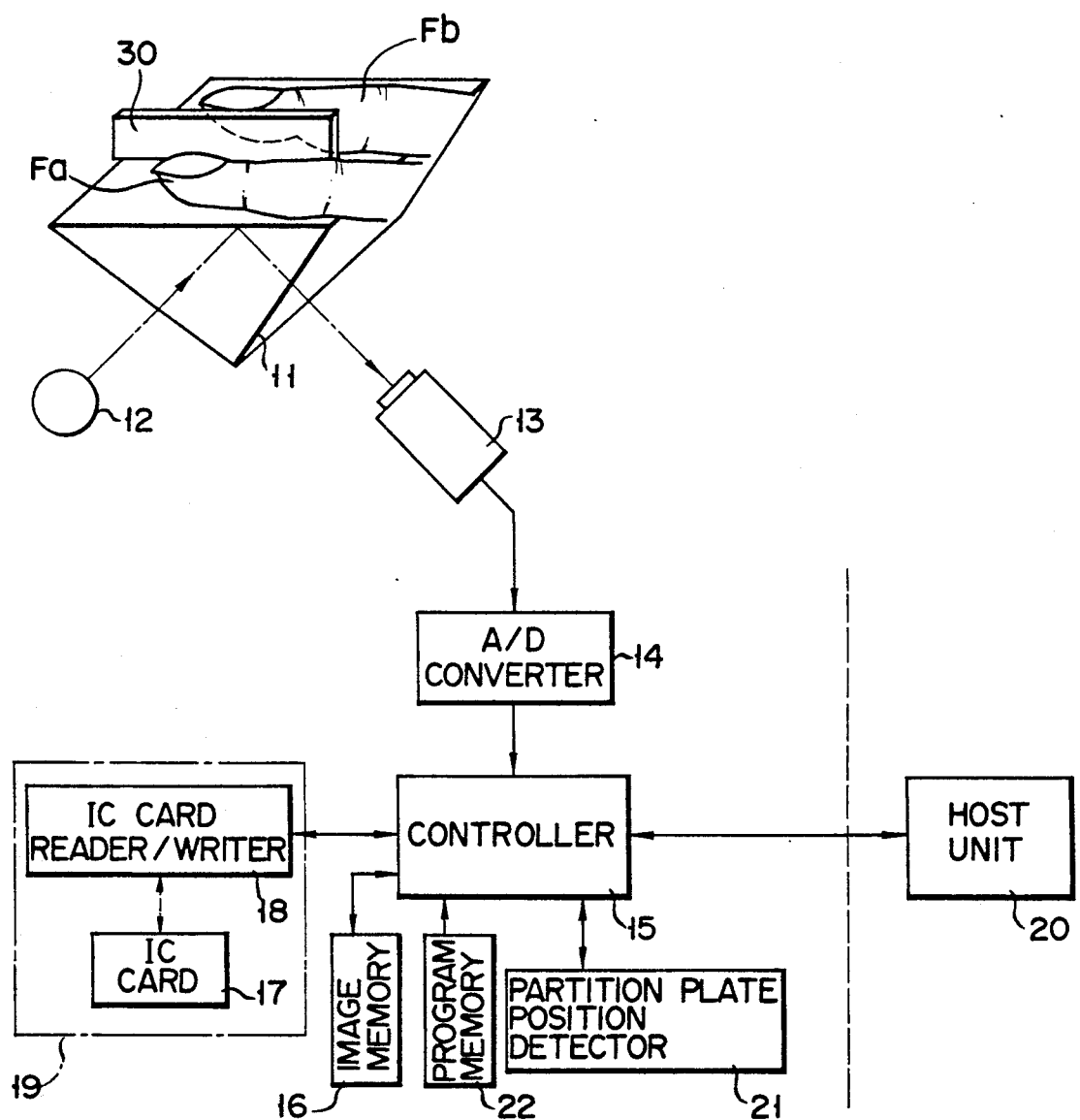
FIG. 8 is a block diagram showing a personal verification apparatus according to the third embodiment of the present invention.

FIG. 8 is a block diagram showing the third embodiment of the present invention. As shown in FIG. 8, in this embodiment, when light from a light source 12 disposed below a finger table 11 is radiated through the finger table 11, image data of fingers Fa and Fb placed on the finger table 11 to sandwich a partition plate 30 are read by a camera 13 as a reflection optical image obtained by a difference of contact/noncontact between the finger table 11 and the fingers Fa and Fb.

In a controller 15, the finger image stored in a image memory 16 is separated into the images of the fingers Fa and Fb in response to an output from a partition plate position detector 21, and feature data of the fingers Fa and Fb are obtained to output the data to a dictionary section 19, thereby registering the feature data to be collated.

The partition plate position detector 21 reads the position of the partition plate 30 on the image. In this case, the partition plate 30 need not be moved if it is once fixed, in principle. Therefore, the detector 21 is arranged to establish a correspondence between the partition plate 30 and the coordinate positions on the position image when the partition plate 30 is fixed.

As shown in FIGS. 9A, 9B, 10A, and 10B, the partition plate 30 is mounted to be perpendicular to a surface on the finger table 11 which abuts against fingers, and to be parallel to the x axis on the image. Therefore, when the person to be verified places, e.g., the fingers Fa and Fb on the finger table 11, the fingers Fa and Fb sandwich the partition plate 30. Therefore, both the fingers Fa and Fb can be placed to be substantially parallel to each other along the partition plate 30.

The partition plate 30 can be vertically movable. As shown in FIG. 10A, the partition plate 30 is normally mounted and fixed at a position spaced apart from the surface of the finger table 11 which abuts against the fingers by a very small distance a. That is, the partition plate 30 is mounted not to be in contact with the surface of the finger table 11. For this reason, the image of the partition plate 30 does not appear on an input image when the finger image is input. Therefore, only the finger image can be stably detected without degrading its quality.

In addition, a silicone rubber 30a is mounted at a lowermost portion, e.g., both edge portions, of the partition plate 30. The silicone rubber 30a allows a tight contact between the partition plate 30 and the finger table 11 when the position of the partition plate 30 is fetched as a coordinate position on the image by the partition plate position detector 21. The partition plate 30 need not be moved if it is once fixed, in principle. Therefore, prior to fixing the partition plate 30 at a position spaced apart from the finger table 11 by the very small distance a, a correspondence between the position of the partition plate 30 and the coordinate positions on the image can be established. In this case, as shown in FIG. 10B, the height of the partition plate 30 is adjusted to cause the partition plate 30 to be brought into contact with the finger table 11. As a result, the silicone rubber 30a mounted at the edges of the partition plate 30 prevents total reflection of light at this portion, thus scattering light. As a result, as shown in FIG. 11A, the partition plate 30 can be detected as an image by the position detector 21.

When the image of the partition plate 30 is detected, a sum signal in the x direction of the detected image of the partition plate 30 is obtained. As shown in FIG. 11B, in the sum signal in the x direction, a maximum peak appears at a y coordinate corresponding to the position of the partition plate 30. When the y coordinate yt at which the maximum peak appears is computed, the position to separate the finger image into the images of the fingers Fa and Fb can be obtained.

When the separating position (y coordinate yt) is computed, the partition plate 30 is fixed at a position spaced apart from the finger table 11 by the very small distance a, thereby setting a normal state in which personal verification can be performed.

Thus, when a plurality of fingers are placed on a finger table along a partition plate, any inclination of the fingers can be prevented. In addition, when a correspondence between the position of the partition plate and the coordinate positions on the input image is established in advance, a finger image can be separated into the images of the respective fingers without specific processing upon an input of the image.

What is claimed is:

1. A personal verification apparatus for performing personal verification using a plurality of fingers, comprising:
   feature data memory means for storing feature data to be collated of the fingers;
   input means for inputting image data of the plurality of fingers, the image data including at least two joints of each finger;
   separating means for separating the image data of the plurality of fingers input by said input means into image data for each of the plurality of fingers;
   generating means for adding the density of the image data of the fingers separated by said separating means in a direction perpendicular to the longitudinal direction of the fingers to output the added data as feature of the fingers; and
   collating means for individually comparing and collating the feature data obtained by said generating means with the feature data to be collated stored in said feature data memory means for each of the plurality of fingers to determine coincidence or noncoincidence.

2. An apparatus according to claim 1, wherein the number and kind of the plurality of fingers are known to only a person to be verified.

3. An apparatus according to claim 1, wherein said separating means separates the image data of the plurality of fingers using a minimum value obtained by adding the density of the image data of the plurality of fingers in the longitudinal direction of the fingers.

4. A personal verification apparatus for performing personal verification using a plurality of fingers, comprising:
   input means for inputting image data of the plurality of fingers, the image data including at least two joints of each finger;
   separating means for separating the image data of the plurality of fingers input by said input means into image data for each of the plurality of fingers;
   feature data generating means for adding a density of the image data of each of the fingers separated by said separating means in a direction perpendicular to a longitudinal direction of the fingers to output data as feature data of each of the plurality of fingers;
   memory means for storing feature data to be collated corresponding to the feature data output from said feature data generating means;
   collating means for individually collating the feature data output from said feature data generating means with the feature data to be collated stored in said memory means for each of the plurality of fingers;
   phase shaft detecting means for computing a phase coincidence position of the feature data and the feature data to be collated for each of the plurality of fingers in accordance with a collation result obtained by said collating means to detect a phase shift between these data based on the phase coincidence position; and
   determining means for determining personal verification in accordance with the collation result of each of the plurality of fingers obtained by said collating means and the phase shift data detected by said phase shift detecting means.

5. An apparatus according to claim 4, wherein said phase shift detecting means collates phases by obtaining and determining a degree of phase coincidence PD in accordance with PD=Ma−Mb, where Ma and Mb are shift elements of first and second fingers, which are minimum values of sum results Sa(m) and Sb(m) obtained by adding a squared difference of data Aa(i+m) and Ab(i+m) obtained by respectively shifting, by m, feature data Aa(i) and Ab(i) obtained by said feature data generating means, and feature data Aad(i) and Abd(i) stored in said memory means, within given ranges.

6. An apparatus according to claim 4, wherein said separating means separates the image data corresponding to the plurality of fingers at a minimum value position of a sum signal obtained by adding a density of the image data in a longitudinal direction of the fingers.

7. An apparatus according to claim 5, wherein the plurality of fingers are the first and second fingers, and assuming that sum values of the data of the first and second fingers generated by said feature data generating means are Sa(Ma) and Sa(Mb), and a phase shift detected by said phase shift detecting means is PD, said determining means determines personal verification using a combination of the parameters Sa(Ma), Sa(Mb), and PD and the following determination function:

$$DF = a \times Sa(Ma) + b \times Sa(Mb) + c \times PD$$

where a, b, and c are constants.

8. A personal verification apparatus for performing personal verification using a plurality of fingers, comprising:
memory means for storing feature data to be collated of the fingers;
input means for inputting image data of the fingers, the image data including at least two joints of each finger;
guide means, having a finger table on which the fingers are placed for guiding the placement of the fingers;
means for adding a density of the image data of the fingers input by said input means in a direction perpendicular to a longitudinal direction of the fingers to generate feature data; and
collating means for collating the feature data generated by said generating means with the feature data to be collated stored in said memory means.

9. An apparatus according to claim 8, wherein said guide member includes a partition plate, and further includes means for causing a position of said partition plate to correspond to a position on an input image.

10. A personal verification apparatus for performing personal verification using a plurality of fingers, comprising:
feature data memory means for storing feature data to be collated of the fingers;
input means for inputting image data of the plurality of fingers, the image data including at least tow joints of each finger;
separating means for separating the image data of the plurality of fingers input by said input means into image data for each of the plurality of fingers;
generating means for adding the density of the image data of each of fingers separated by said separating means in a direction perpendicular to the longitudinal direction of the fingers to output the added data as feature data of each of the fingers; and
collating means for individually comparing and collating the feature data obtained by said generating means with the feature data to be collated stored in said feature data memory means for the respective fingers to determine coincidence or noncoincidence.

* * * * *